United States Patent [19]

Weber et al.

[11] Patent Number: 4,995,438

[45] Date of Patent: Feb. 26, 1991

[54] MULTI-CHAMBERED PNEUMATIC TIRE AND WHEEL ASSEMBLY HAVING AN INNER TIRE AND AN OUTER TIRE

[75] Inventors: Michael J. Weber, Akron; Stuart D. Grant, Silver Lake, both of Ohio

[73] Assignee: The Goodyear Tire & Rubber Company, Akron, Ohio

[21] Appl. No.: 430,469

[22] Filed: Nov. 2, 1989

[51] Int. Cl.$^5$ .................. B60C 17/01; B60C 5/20
[52] U.S. Cl. .................. 152/518; 152/158; 152/339.1; 152/516
[58] Field of Search ............ 152/157, 158, 331.1, 152/339.1, 340.1, 341.1, 342.1, 510, 516, 518, 519, 520

[56] References Cited

U.S. PATENT DOCUMENTS

| | | | |
|---|---|---|---|
| 2,731,061 | 1/1956 | Clark | 152/341.1 |
| 3,191,654 | 6/1965 | Anderson et al. | 152/341.1 |
| 3,476,168 | 11/1969 | Huber et al. | 137/234.5 |
| 3,487,870 | 1/1970 | Huber | 137/22.3 |
| 3,496,983 | 2/1970 | Bartley et al. | 152/340.1 |
| 4,153,095 | 5/1979 | Sarkissian | 152/518 |

Primary Examiner—Michael W. Ball
Assistant Examiner—Gregory J. Wilber
Attorney, Agent, or Firm—David L. King; L. R. Drayer; R.J. Slattery, III

[57] ABSTRACT

A multi-chambered tire assembly (10) is provided by a pneumatic outer tire (12) mounted upon a rim (16) of a wheel and having an inner tire (14) or shield which is also mounted upon the rim (16). The inner tire (14) has a crown portion (36) spaced from the outer tire and a pair of sidewalls (38) each extending from the crown to a bead portion (40, 42). At least one of the bead portions (42) of the inner tire (14) forms an air passage way (44) between it and the adjacent bead (22) of the outer tire and is provided with radially extending grooves (52) connecting the air passage way with the outer air chamber (32).

3 Claims, 2 Drawing Sheets

4,995,438

MULTI-CHAMBERED PNEUMATIC TIRE AND WHEEL ASSEMBLY HAVING AN INNER TIRE AND AN OUTER TIRE

BACKGROUND OF THE INVENTION

The present invention relates generally to tires and in particular to multi-chambered tires. More particularly this invention relates to race tires having an inner tubeless pneumatic shield or inner tire.

Race tires may have an inner tire, otherwise known as a shield, which is mounted on the ledge of the bead seating portion of a rim and which is axially inward of the bead portions of the outer tire. The inner tire has a crown portion, which when mounted, is spaced from the inner surface of the crown or ground engaging portion of the outer tire, and a pair of sidewalls which extend from the axial edges of the crown portion to a bead portion. Each bead portion of the inner tire has a bead core (an annular tensile member) therein. In other words, the inner tire or shield when mounted upon a tire and rim assembly acts as a tire within a tire which helps in stabilizing a vehicle after an outer tire failure. This divides the tire assembly into outer and inner chambers, the outer chamber being the space between the radially outer surface of the inner tire and the radially inner surface of the outer tire while the inner chamber is formed by the inner surface of the inner tire and the rim of the wheel. Typically air is retained within the inner chamber by an air container, such as a tube. The chambers can then be inflated by a dual inflation valve in which air passes through grooves in the radially inner end and axially outer end of the bead portions, such as illustrated in U.S. Pat. No. 3,476,168 to HUBER, et al.

In tires in general, and race tires in particular, it is important to keep the weight of the tire and rim assembly to a minimum in order to optimize fuel efficiency and to decrease the amount of rotating mass to provide for more rapid acceleration/deceleration. A tire and wheel assembly as described above may weigh for example from about 60 lbs. to about 70 lbs. for a 28.0×10.0–15 size tire and a 9.5×15" rim. The air container or inner tube of such an assembly may weigh about 5 lbs. Therefore, if the inner tube could be eliminated this would result in the tire and wheel assembly being reduced in weight from about 7% to a little more than 8%, which would result in about a 20 lb. reduction in total rotating mass.

The elimination of the air container from the tire and wheel assembly also would eliminate the problem associated with a failure of the air container. If the air container fails, air is then able to pass from the air container to the outer chamber which will result in an equalization of air pressure in both chambers.

SUMMARY OF THE INVENTION

It, therefore, is an object of this invention to provide an assembly of an outer tire, an inner tire and a rim that does not require the use of an inner tube or air container and that can be mounted upon a substantially standard rim.

It is another object of this invention to isolate the inner chamber air from the outer chamber air to prevent the equalization of the air pressures of each during operation.

It is an advantage of the invention that a tire and wheel assembly can be produced which is reduced in weight from the standard assemblies.

It is another advantage that equalization of air pressures between the inner and outer chambers due to a failure of the air container have been eliminated.

It is a feature of the invention that the assembly of an outer tire, an inner tire and a rim is provided with a circumferentially extending air passage way disposed between a bead portion of both the inner tire and the outer tire and which is connected with the outer chamber by radially outwardly extending grooves.

These and other objects, advantages and features can be accomplished by an assembly comprising a rim having a pair of diametrically opposed annular bead seating portions, each bead seating portion having a ledge and a radially outwardly extending flange;

a tubeless pneumatic outer tire mounted on the rim having an inner cavity and a pair of axially opposed bead portions, each bead portion being disposed adjacent to a ledge and a respective flange of one of the bead seating portions of the rim;

a tubeless pneumatic inner tire disposed within said tire cavity, mounted on said rim, dividing said inner cavity into inner and outer chambers, and having first and second axially opposed bead portions, the first bead portion of the inner tire being disposed adjacent to a ledge of one of said bead seating portions of the rim and the respective bead portion of the outer tire, and the second bead portion of the inner tire being disposed adjacent to the ledge of the other bead seating portion of the rim and is both disposed adjacent to and spaced from the respective bead portion of the outer tire, to form a circumferentially extending air passage way, and the second bead portion of said inner tire having at least one radially extending groove disposed along its axial outer end to allow the passage of air to and from the air passage way to the outer chamber;

an inflating valve carried by said rim for allowing the passage of air to and from the air passage way; and an inflation means carried by said rim for allowing the passage of air to and from the inner chamber.

BRIEF DESCRIPTION OF THE DRAWINGS

The following is a brief description of the drawings in which like parts may bear like reference numerals and in which.

DESCRIPTION OF THE INVENTION

Figure 1:
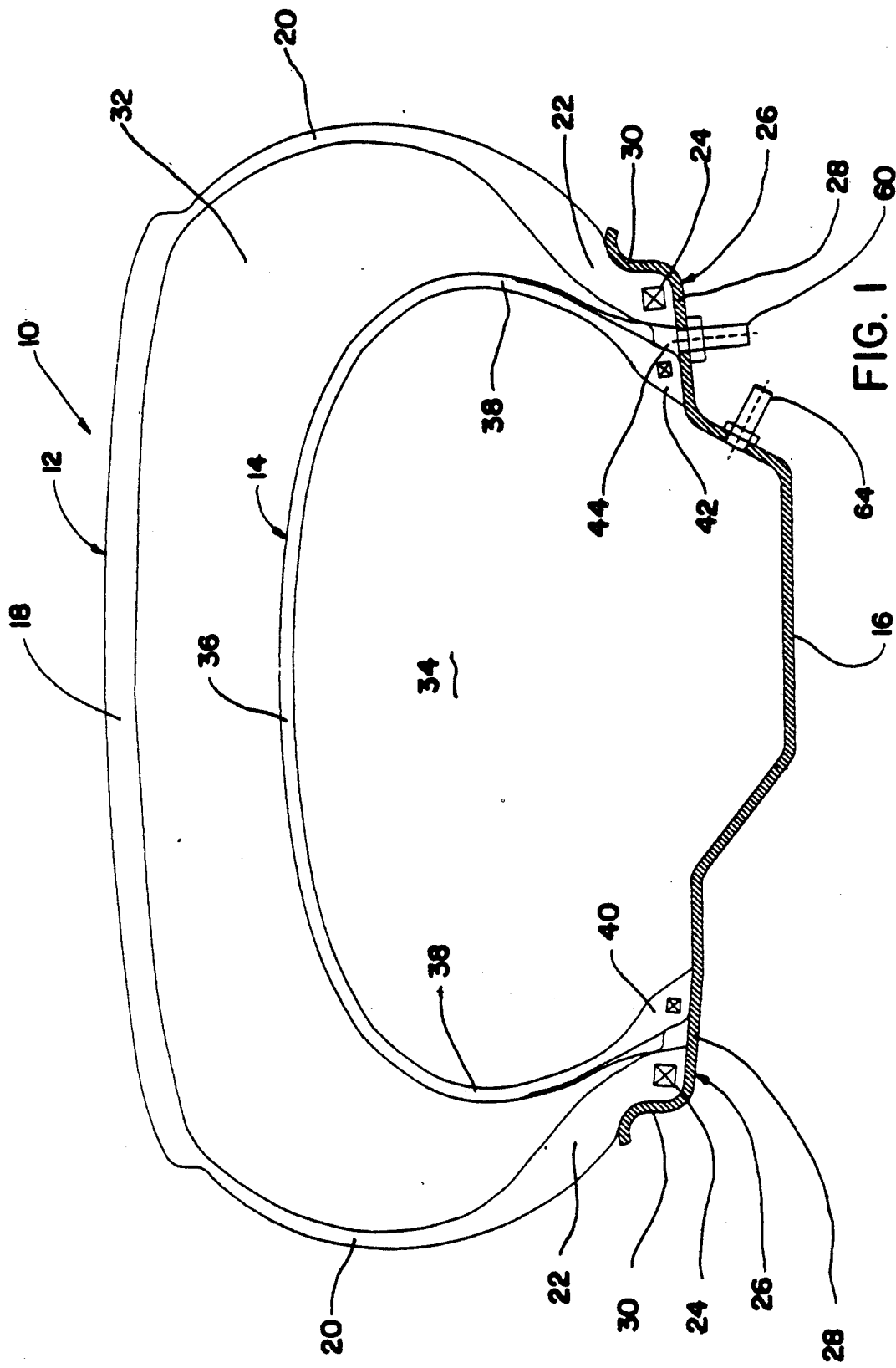
FIG. 1 is a cross-sectional view of the assembly of an outer tire, an inner tire and a rim.
Figure 2:
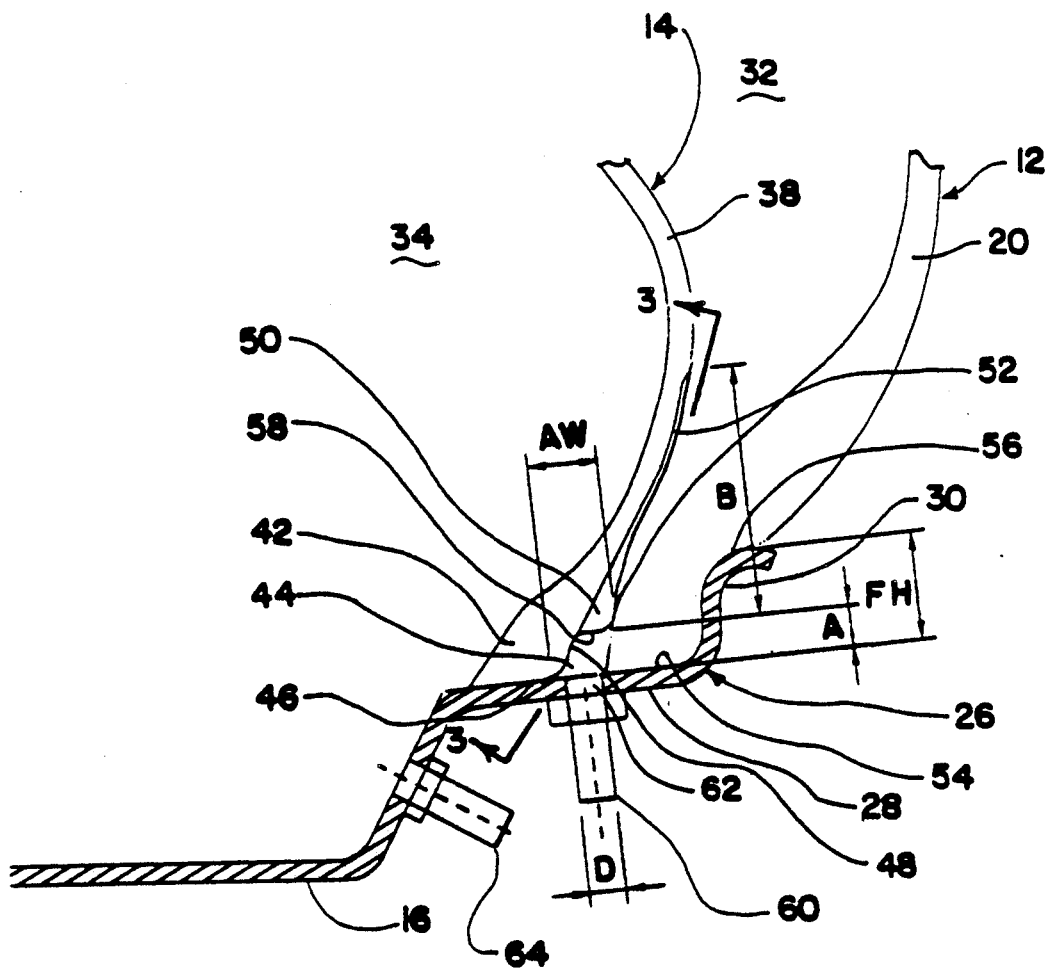
FIG. 2 is an enlarged fragmentary view of the bead area of the outer and inner tires and the ledge and flange of the bead seating portion of the rim.
Figure 3:
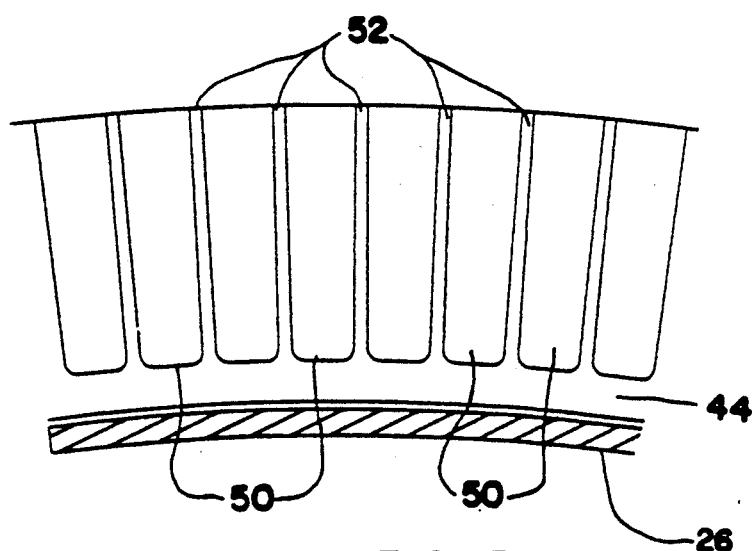
FIG. 3 is a fragmentary cross-section taken along line 3—3 of FIG. 2.

The following definitions are applicable to this specification, including the claims, wherein:

"Axial" and "axially" are used herein to refer to lines or directions that are parallel to the axis or rotation of the tire and rim assembly.

"Bead portion" means are that part of the outer tire or inner tire comprising an anpular tensile member wrapped by ply cords and shaped, with or without other reinforcement elements such as flippers, chippers, apexes, toe guards and chafers, to fit the design rim.

"Inner" means toward the inside of the tire and rim assembly and "outer" means toward its exterior.

"Radial" and "radially" are used to mean directions radially toward or away from the axis or rotation of the tire and rim assembly.

In conjunction with the drawings, a tire and rim assembly, shown generally as reference numeral 10 comprises a tubeless pneumatic outer tire 12, a tubeless pneumatic inner tire 14 and a rim 16. The outer tire 12 has a ground engaging tread portion 18 and a pair of axially spaced sidewalls 20 extending radially inwardly from the tread portion 18 to a bead portion 22. Each bead portion 22 has an annular tensile member 24 therein.

The rim 16 has a pair of diametrically opposed annular bead seating portions 26, each having a ledge 28 and radially outwardly extending flange 30. The outer tire 12 is mounted upon the rim 16 such that each bead portion 22 of the outer tire engages both the ledge 28 and the flange 30 of the respective bead seating portion 26.

The tubeless pneumatic inner tire 14 is located within the cavity formed by the outer tire 12 and rim 16 and mounted on the rim to divide the cavity into radially outer 32 and radially inner 34 cavities. The inner tire has a crown portion 36 spaced from the outer tire 12 and a pair of axially spaced sidewalls 38 each extending radially inwardly from the crown portion 36 to a respective bead portion 40, 42. The inner tire 14 is mounted upon the rim 16 such that each bead portion 40, 42 of the inner tire engages both a ledge 28 and the respective bead portion 22 of the outer tire 12. At least one bead portion 42 of the inner tire 14 is both adjacent to and spaced from the respective bead portion 22 of the outer tire 12 to form a circumferentially extending air passage way 44.

The bead portion 42 of the inner tire 14 has a radial inner end 46 adjacent to the respective ledge 28 and an axially outer portion 48 extending radially outwardly from the radial inner end 46 to a protrusion 50 which tapers radially outwardly. The protrusion is adjacent to and engages with the respective bead portion 22 of the tire to form the radially outer side of the air passage way 44. The protrusion 50 of the bead portion 42 of the inner tire is further provided with radially extending grooves 52 for allowing the passage of air to and from the outer chamber 32 and the air passage way 44.

The protrusion 50 is located radially outwardly of the bead seating portion 26 a distance A which is at least 30% of the flange height FH of the flange 28. The flange height FH being the distance from the radially outer surface 54 of the ledge of the bead seating portion 26, to the radially outermost point 56 of the flange. While the distance A is the distance from the radially outer surface 54 of the ledge 28 to the radially inner surface 58 of the protrusion. In other words the distance A is the height of the air passage way. It is believed that the air passage way should have a minimum height A to assure that the air passage way does not collapse or fill with rubber when the inner tire is mounted upon the rim, but is less than the flange height FH to insure a seal between the chambers. For example the distance may be within the range of about 30% to about 80% of the flange height FH. The protrusion 50 should have a sufficient mass such that en effective seating is provided by the inner tire.

The protrusion 50 and the associated grooves 52 may extend from the radially inner surface of the protrusion 58, radially outwardly a distance B which would assure that the grooves will extend past the point where they could be collapsed by the adjacent bead of the tire. In other words it should extend past the point of contact between the beads of the inner and outer tire. It is therefore believed to be preferable that B should be equal to or greater than the difference between the flange height FH less the height of air passage way A, (FH-A). It is still more preferred that the distance B is at least $2 \times (FH-A)$.

A valve 60 is provided in the bead seating portion 26 for allowing the passage of air to and from the air passage way 44. In order to assure that the air can pass to and from the air passage way, the axial width AW of the air passageway should be larger than the opening 62 in the rim through which the valve is inserted into. Preferably, the axial width AW of the air passage way is at least 1.2 times the diameter D of the valve opening 62.

The assembly is further provided with another valve 64 which is attached to the rim 16 for providing air to and from the inner chamber 16. It is preferred that the valves 60 and 64 be located 180° apart along the circumference of the rim. A standard rim 16 currently used with race tires can be used by adding the valve 60 to the ledge of the bead seating portion.

After the outer tire and the inner tire have been mounted upon the rim of the wheel the inner chamber 34 is inflated through valve 64 in order to seat the inner and outer tires to the rim. After this has been accomplished the outer chamber is inflated through valve 60. Air passes through the valve 60, into the air passage way 44, and through the radially extending grooves 52 to the outer chamber. The outer chamber is then inflated to a pressure which is less than the inner chamber pressure.

The other bead portion 40 of the inner tire may be also furnished with the protrusion and grooves similarly to that of the bead portion 42. This however is not required. It does though, provide for a balanced inner tire and consequently a better balanced assembly.

While certain representative embodiments and details have been shown for the purpose of illustrating the invention, it will be apparent to those skilled in this art that various changes and modifications may be made therein without department from the scope of the invention.

It is claimed:

1. A tire and rim assembly comprising:
a rim having a pair of diametrically opposed annular bead seating portions, each bead seating portion having a ledge and a radially outwardly extending flange;
a tubeless pneumatic outer tire mounted on said rim having an inner cavity and a pair of axially opposed bead portions, each bead portion being disposed adjacent to a ledge and a respective flange of one of said beat seating portions of said rim;
a tubeless pneumatic inner tire disposed within said tire cavity, mounted on said rim, dividing said inner cavity into inner and outer chambers and, having first and second axially opposed bead portions, the first bead portion of the inner tire being disposed adjacent to a ledge of one of said bead seating portions of the rim and the respective bead portion of the outer tire, and the second bead portion of the inner tire being disposed adjacent to the ledge of the other bead seating portion of the rim and is both disposed adjacent to and spaced from the respective bead portion of the outer tire to form a circumferentially extending air passageway, and said second bead portion of said inner tire having a radially inner end adjacent to the ledge of the respective bead seating portion and an axially outer portion located radially outwardly from the inner end adjacent said ledge and extends axially outwardly from said radially inner end to a protrusion tapering radially outwardly, said protrusion being adjacent to said bead portion of the outer tire and located radially outwardly of the ledge of the respective bead portion a distance in the range of from 30% to 80% of the height of the flange, and said protrusion having a radially extending groove therein to allow the passage of air to and from the air passageway to the outer chamber; and an inflation valve carried by said rim for allowing the passage of air to and from the air passageway; and an inflation means carried by said rim for allowing the passage of air to and from the inner chamber.

2. The assembly of claim 1 wherein said protrusion of the inner tire has a plurality of radially extending grooves therein to allow the passage of air to and from the air passageway.

3. The assembly of claim 2 wherein the protrusion and the associated grooves have a radial length of at least equal to or greater than the difference between the flange height less the height of the air passage way.

* * * * *